(12) United States Patent
Moncrief Brown et al.

(10) Patent No.: US 12,370,966 B1
(45) Date of Patent: Jul. 29, 2025

(54) METHOD AND SYSTEM FOR VEHICLE DAMAGE PROTECTION

(71) Applicant: UIPCO, LLC, San Antonio, TX (US)

(72) Inventors: Donnette L. Moncrief Brown, San Antonio, TX (US); Robert Wiseman Simpson, Fair Oaks Ranch, TX (US); Manfred Amann, San Antonio, TX (US); Timothy Frank Davison, San Antonio, TX (US); Snehal Desai, Richardson, TX (US); Michael J. Maciolek, Kerrville, TX (US); Kelsey Anne O'Brien, Austin, TX (US); Eric David Schroeder, San Antonio, TX (US); Emily Margaret Gray, San Antonio, TX (US); Justin Dax Haslam, San Antonio, TX (US); Matthew Ryan Santacroce, Rio Rancho, NM (US)

(73) Assignee: United Services Automobile Association (USAA), San Antonio, TX (US)

( * ) Notice: Subject to any disclaimer, the term of this patent is extended or adjusted under 35 U.S.C. 154(b) by 300 days.

(21) Appl. No.: 17/555,713

(22) Filed: Dec. 20, 2021

Related U.S. Application Data

(60) Provisional application No. 63/128,998, filed on Dec. 22, 2020.

(51) Int. Cl.
*B60R 19/40* (2006.01)
*B60R 19/42* (2006.01)
*B62D 21/15* (2006.01)

(52) U.S. Cl.
CPC ............. *B60R 19/40* (2013.01); *B60R 19/42* (2013.01); *B62D 21/157* (2013.01)

(58) Field of Classification Search
CPC . B60R 19/40; B60R 19/42; B60R 2021/0006; B60R 2021/0009;
(Continued)

(56) References Cited

U.S. PATENT DOCUMENTS 6,405,132 B1 * 6/2002 Breed .................... G08G 1/161
701/45
6,859,705 B2 * 2/2005 Rao ....................... G01S 13/931
342/72
(Continued)

FOREIGN PATENT DOCUMENTS

CN         1625498 A  *  6/2005  ........... B60R 19/205
CN       104773125 A  *  7/2015  ........... B60R 19/023
(Continued)

*Primary Examiner* — Hung Q Nguyen
(74) *Attorney, Agent, or Firm* — Plumsea Law Group, LLC

(57) ABSTRACT

A method and system of intelligently deploying protective structures along the sides of a vehicle in order to protect the vehicle from damage is disclosed. The vehicle includes two protective structures such as bumpers that are each stored in a retracted position during normal vehicle operations. The system receives data collected by sensors in the vehicle to determine whether an accident is likely. If the system determines there is a high likelihood that an accident will occur, one or both protective structures can be deployed from the sides of the vehicle to protect the body of the vehicle from damage.

20 Claims, 10 Drawing Sheets

(58) Field of Classification Search
CPC .... B60R 2021/0023; B60R 2021/0025; B60R 19/02; B60R 19/023; B60R 2019/026; B62D 21/157; B60N 2220/30; B60N 2220/20; B60N 2/273
See application file for complete search history.

(56) References Cited

U.S. PATENT DOCUMENTS

| | | | |
|---|---|---|---|
| 2004/0160050 A1* | 8/2004 | Strong | B60R 19/205 180/271 |
| 2005/0127645 A1* | 6/2005 | Smith | B60N 2/015 180/274 |
| 2005/0192727 A1* | 9/2005 | Shostak | G07C 5/0808 701/1 |
| 2005/0278098 A1* | 12/2005 | Breed | G01S 7/023 701/45 |
| 2008/0040004 A1* | 2/2008 | Breed | G01S 7/023 701/45 |
| 2008/0119993 A1* | 5/2008 | Breed | G01S 7/023 701/45 |
| 2014/0200772 A1* | 7/2014 | Holmes | B60R 19/40 701/45 |
| 2017/0113639 A1* | 4/2017 | Tsang | B60R 19/42 |
| 2017/0232918 A1* | 8/2017 | Sancricca | B60R 21/013 701/45 |
| 2019/0054877 A1* | 2/2019 | Rastegar | B60R 19/023 |

FOREIGN PATENT DOCUMENTS

| | | | | |
|---|---|---|---|---|
| CN | 105774724 A | * | 7/2016 | B60R 19/023 |
| DE | 102006030000 A1 | * | 1/2008 | B60R 19/40 |
| DE | 102014100075 A1 | * | 7/2014 | B60R 19/023 |
| FR | 2949404 A1 | * | 3/2011 | B60R 13/04 |
| GB | 2301922 A | * | 12/1996 | B60J 10/00 |
| WO | WO-0113141 A2 | * | 2/2001 | G01S 13/34 |
| WO | WO-02093529 A1 | * | 11/2002 | G01V 3/15 |
| WO | WO-03096068 A1 | * | 11/2003 | G01S 13/931 |

* cited by examiner

METHOD AND SYSTEM FOR VEHICLE DAMAGE PROTECTION

CROSS-REFERENCE TO RELATED APPLICATION

This application claims the benefit of U.S. Provisional Patent Application Ser. No. 63/128,998 filed on Dec. 22, 2020 and titled "Method and System for Vehicle Damage Protection", the disclosure of which is incorporated by reference in its entirety.

TECHNICAL FIELD

The present disclosure generally relates to a vehicle protection system, and specifically to a mechanism by which a vehicle deploys a side bumper in response to a detection of a possible low-impact collision.

BACKGROUND

Automobiles are becoming more sophisticated with each new model year. For example, modern vehicles are being designed with safety systems to reduce collisions and mitigate those collisions that do occur. Collision avoidance systems include a wide range of technologies spanning from anti-lock brakes to headlight tracking systems to obstacle avoidance systems. Collision mitigation systems include things like interior and exterior airbag deployment systems, pre-tensioning seat belts, fuel line cutoff systems, and emergency response alert systems. Collision avoidance and collision mitigation systems are subsets of intelligent vehicle systems. Vehicle intelligence in this context encompasses the capacity of a vehicle to detect a condition and respond to the condition.

Despite the presence of such systems, vehicles continue to experience damage during day-to-day driving activities. Although collision mitigation systems can be critical in protecting passengers, the body of the vehicle itself remains vulnerable. It is desirable that damage to the vehicle be avoided whenever possible, including in low impact where there is little risk to passengers. Conventional vehicle protection systems have remained static, rather than dynamic, and have not been included in intelligent vehicle system architectures.

There is a need in the art for a system and method that addresses the shortcomings discussed above.

SUMMARY

In one aspect, a method of triggering deployment of a protective structure on a vehicle is disclosed. The method includes a first step of, the method comprising receiving, at an onboard computing system for the vehicle, first data, and a second step of determining that the first data matches a condition corresponding to a triggering event. In addition, the method includes a third step of deploying, in response to determining a triggering event has occurred, a first protective structure from a first side of the vehicle.

In another aspect, a method of deploying a protective structure on a vehicle based on detecting conditions associated with an imminent vehicle collision is disclosed. The method includes a first step of receiving first sensory information from a first sensor, and a second step of analyzing the first sensory information and determining that a collision is likely to occur. The method further includes a third step of automatically deploying a first protective structure associated with a first side portion of the vehicle in response to determining a collision is likely to occur.

In another aspect, a system for deployment of a protective structure for a vehicle in response to detection of conditions associated with an imminent vehicle collision includes a processor and machine-readable media including instructions which, when executed by the processor, cause the processor to receive first sensory information from a first sensor. The instructions further cause the processor to analyze the first sensory information and determine that a collision is likely to occur. In addition, the instructions cause the processor to automatically deploy a first protective structure associated with a first side portion of the vehicle in response to determining a collision is likely to occur.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide system and methods for automatically detecting when a vehicle collision has occurred and, in response, deploying a protective structure along the side of the vehicle (e.g., a "side bumper"). The system and method can use sensed information from vehicle sensors, sensors from a mobile device (such as a smartphone) that is in the vehicle at the time of the impending collision, and/or from roadway sensors to detect specific conditions indicating a low-impact collision is imminent or otherwise highly likely to occur. By analyzing the sensed information, the system can determine if the side bumper should be deployed or enabled. By automatically deploying such a protective structure in response to a likely collision, the system and method can help reduce or prevent physical damage across different regions of the vehicle, particularly during low-speed collisions or accidents.

For purposes of this application, the term protective structure refers to a component or physical barrier or shield, usually made of steel, aluminum, rubber or plastic, that is configured to absorb shocks from car accidents. Protective structures, such as bumpers, generally consist of a plastic cover and underneath, a reinforcement bar made of steel, aluminum, fiberglass composite, or plastic. A bumper system can include mechanisms that compress to absorb crash energy, such as but not limited to polypropylene foam or plastic honeycomb, or "egg crate". The protective structure is typically designed to protect car bodies from damage in low-speed accidents, absorbing crash energy without significant damage to the protective structure (e.g., bumper) itself. Motor vehicles have historically been equipped with bumpers along the front and/or rear ends of the vehicle. Front and rear bumpers are designed to protect the hood, trunk, grill, fuel, exhaust and cooling system. However, the sides of vehicles have remained exposed. Vehicle manufacturers and consumers have been resistant to the addition of a cumbersome, obtrusive, unattractive component protruding from the sides of their vehicles. The proposed vehicle protection systems allow for a hidden or otherwise discreet or low-profile protective structure along the sides of a vehicle that can be engaged or "popped out" when needed to provide protection to the vehicle's sides during an accident. In addition, cars that include this system could reduce reinforcement of car doors and B-pillars, resulting in a lighter and therefore more fuel-efficient vehicle.

Figure 1A:
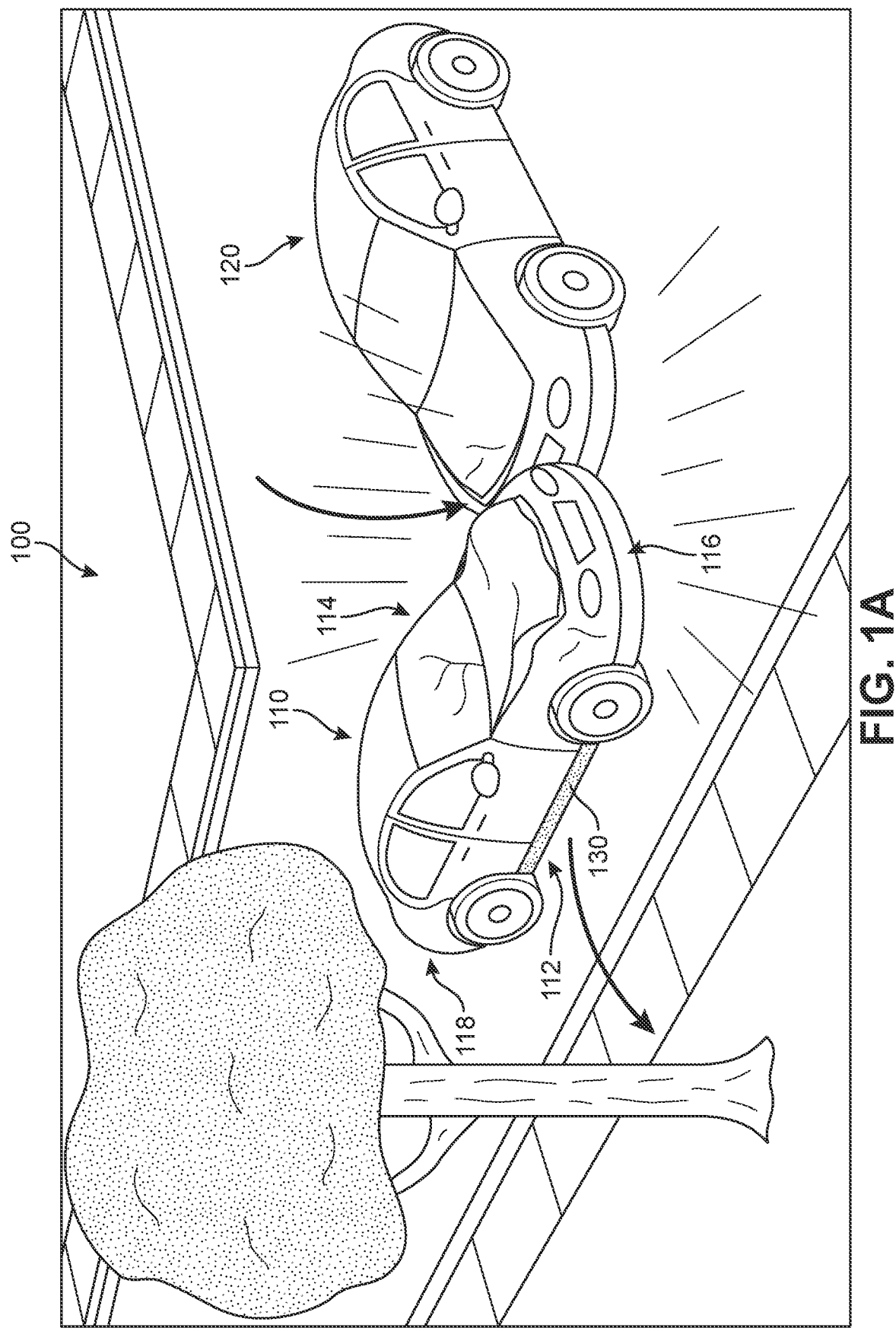
FIGS. 1A and 1B are a depiction of a scenario in which deployment of an embodiment of a protective structure occurs.
Figure 1B:
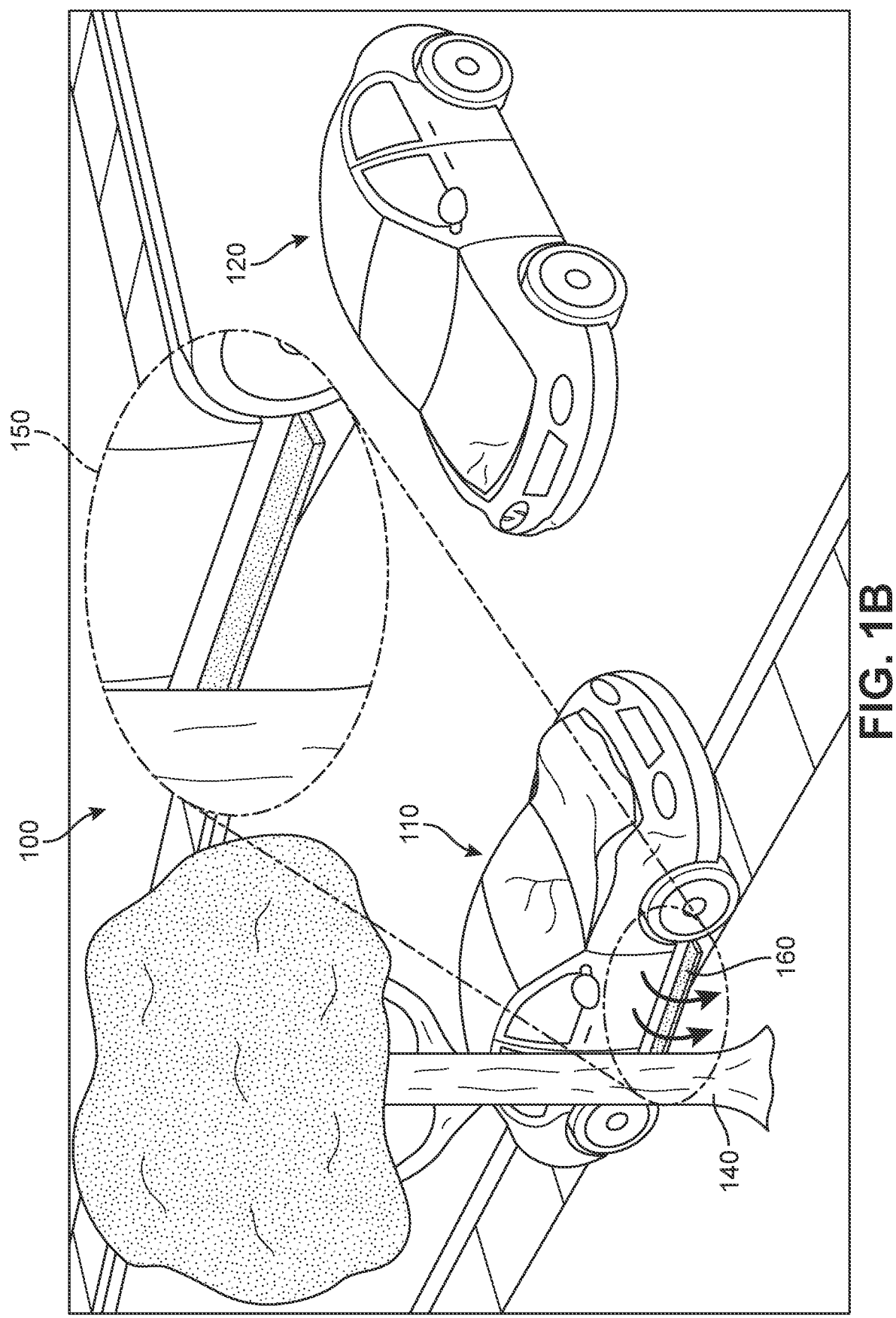

For purposes of clarity, an overview of one embodiment of the proposed systems and methods is illustrated with reference to FIGS. 1A and 1B. FIGS. 1A and 1B depict a scenario in which an embodiment of a vehicle protection system may be employed. In FIG. 1A, a first car 110 is driving in rainy, wet, and slippery conditions. In this case, the first car 110 has begun to skid when the driver attempts to engage the brakes. In this example, first car 110 includes a standard bumper along a forward portion 116 and another standard bumper along a rear portion 118. Furthermore, the first car 110 includes a protective mechanism (currently inactive) installed along both its outwardly-facing first side 112 (extending along the external side that includes front passenger-side door) and its outwardly-facing second side 114 (extending along the external side that includes the driver-side door). In FIG. 1A, the first side 112 includes a panel 130 that is configured for release upon detection of an imminent collision or other accident. This is depicted in FIG. 1A, where the driver of first car 110 has engaged the brakes in an attempt to regain control of the vehicle. The first car 110 is skidding 102 and moving off of the roadway toward a tree 140. The vehicle protection system determines the sensor data for vehicle conditions received around this time indicates that an accident is about to occur or is occurring (referred to herein as a triggering event 104).

As shown in FIG. 1B, in response to this determination, the vehicle protection system for first car 110 has triggered the deployment of a first protective structure ("first bumper") 160 from behind the panel, more clearly illustrated in a magnified view 150. The first bumper 160 in this case has been released from its initial (retracted) position of FIG. 1A and transitioned to a protruding (deployed) position in FIG. 1B. When the side bumper is in the initial position it is designed to be stored, rest or be otherwise disposed flush against the side of the car, rather than protruding outward. For example, as shown in FIG. 1A, the only indication of the presence of the first bumper 160 is a panel extending between the rear tire and front tire on the first side 112. However, once the system has been activated, the panel 'pops' open, allowing the bumper to move outward or launch in a distal direction (away from a midline of the car) via a deployment mechanism such as a spring(s) mechanism, compressed air system, or other such mechanism. The panel can be opened by the system to permit the release of the bumper that was stored within the compartment provided or formed along the side of the vehicle. In the subsequent protruding or deployed position, the car is equipped with a protective shield from impacts along its side. For example, as shown in FIG. 1B, the first car 110 has travelled laterally or in a sideways direction, moving off the roadway and onto a sidewalk until it strikes a tree 140. In this case, the first bumper 160 has served as a buffer or barrier between the side of the car and the tree 140, thereby preventing and/or minimizing scratches and other damage that would have otherwise occurred.

In different embodiments, a bumper deployed in such a manner will be dimensioned and positioned along the side of the vehicle to maximize its protective properties. The side bumper is designed to absorb impact in a minor collision, ideally minimizing repair costs. The side bumpers may be positioned to minimize height mismatches between vehicles and protect pedestrians from injury. Bumper height from the roadway surface may be important in engaging other protective systems. For example, airbag deployment sensors typically do not trigger until contact with an obstruction, and it is important that side bumpers be the first parts of a vehicle to make contact in the event of a side collision, to leave sufficient time to inflate the protective cushions within the vehicle. In one embodiment, the side bumper will be deployed such that its lowermost surface is approximately 16 to 20 inches above the road surface for passenger vehicles such as cars, SUVs, minivans and pickup trucks, while in other embodiments the side bumper can be lower or higher relative to the road surface. In some cases, the height and placement of side bumpers may be determined by the country's legally specified specifications.

The bumper's dimensions can vary widely to accommodate the corresponding dimensions of the sides of the vehicle in which the system is implemented. The bumper can extend across an entirety of a side of the vehicle, from the tail-end to the front of the vehicle, or along shorter lengths, such as between the front tire and rear tire. In some embodiments, there can be a plurality of smaller bumpers that deploy simultaneously along the sides of the vehicle. The thickness, width, and length of the bumper, as well as its shape can also vary to optimize the protective benefits and features for a specific vehicle type. For example, trucks may have larger side bumpers relative to passenger cars. In another embodiment, a bumper may include surface characteristics such as bumps, protrusions, or other grip or texturing to minimize the chances of a car slipping further as it scrapes a nearby object.

Figure 2:
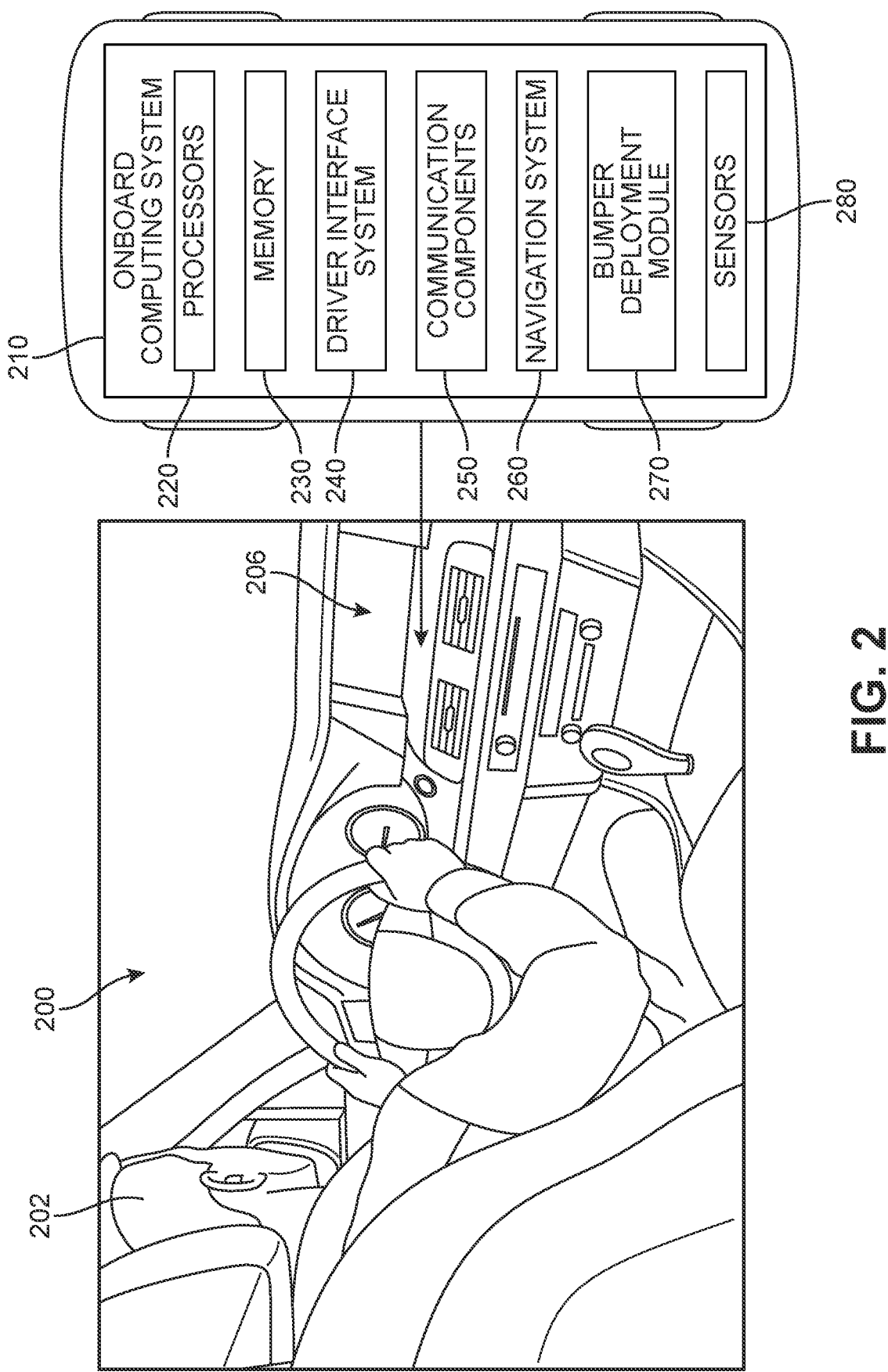
FIG. 2 is an example of an interior view of a motor vehicle alongside a schematic of a vehicle computing system, according to an embodiment.

Referring now to FIG. 2, a view of an interior of one embodiment of a motor vehicle ("vehicle") 200 is illustrated. The vehicle 200 may include an onboard computing system 210. Onboard computing system 210 may comprise a single computing device, or a network of multiple computing devices. Onboard computing system 210 could be associated with one or more electronic control units (ECUs). As seen in FIG. 2, onboard computing system 210 includes one or more processors 220 and memory 230. Memory 230 may comprise a non-transitory computer readable medium. Instructions stored within memory 230 may be executed by the one or more processors 220.

For clarity, some of the vehicle systems of the embodiments are depicted as residing within a single onboard computing system 210. However, it may be appreciated that in some embodiments, one or more of these systems could be separate and may not comprise part of a single computing system. Instead, two or more systems could each comprise their own processors and/or memory, as well as components facilitating communication with other systems.

Vehicle 200 may also include one or more communication components 250. Communication components 250 may include cellular network components for communicating over cellular networks, Wi-Fi components for communicating over Wi-Fi networks, and other communication components.

Vehicle 200 may also include a navigation system 260. In some cases, navigation system 260 includes a GPS receiver that can receive GPS information. In other cases, navigation system 260 can include other receivers capable of receiving global or local positioning information. Additionally, navigation system 260 may comprise maps and/or information from other kinds of geographic information systems (GIS) that can be used to generate navigation routes for a driver.

Vehicle 200 may also include one or more vehicle sensors 280. Vehicle 200 may also include an onboard diagnostics (OBD) system, which is not shown for clarity. An OBD system may track and process various vehicle sensor information. In some cases, one or more systems of vehicle 200 could retrieve sensory data from the OBD system rather than directly from the sensors themselves. For example, sensors can include microphones, cameras, motion sensors, status sensors, and/or crash sensors. It may be appreciated that different sensors can be used with various vehicles, and a single vehicle need not include all of the following sensors.

Generally, microphones could include any kind of microphones known in the art for use in vehicles or mobile devices. A vehicle could include microphones embedded in a dashboard, in a rearview mirror, in the grill, or other locations. Microphones in a vehicle may be useful for speakerphone functionality and for communicating audibly with an onboard intelligent voice assistant. In some embodiments, microphones could be used to detect sounds associated with collisions, such as the sound of breaking glass and/or the sound of crushing metal. In addition, cameras could include any kind of cameras known in the art for use in vehicles or mobile devices. A vehicle could include cameras in a dashboard or rearview mirror, or adjacent to the side bumper(s), for example. In some embodiments, cameras could be used to detect collisions. In some cases, computing system 210 could include machine learning algorithms trained to detect features associated with collisions in images. These features could include broken glass, dents or bends in the vehicle chassis, deployed airbags or other visually identifiable features.

Furthermore, motion sensors could comprise any kinds of motion sensors known in the art. These may include, but are not limited to: passive infrared sensors, microwave sensors, and ultrasonic sensors. Motion sensors could be deployed at selective locations in a vehicle. In some embodiments, motion sensors could be used to detect vibrations from a vehicle collision. Other sensors can include sensors for detecting driving conditions. Driving conditions can be inferred from sensory information retrieved from gyroscopes, accelerometers, and wheel speed sensors, as well as possibly from other sensors. By analyzing vehicle acceleration, orientation, angular velocity and wheel speed, a computing system may be able to detect if a collision has likely occurred. Other sensors may include devices such as laser rangefinders, radar, global positioning system (GPS), cameras (including infrared), and radio frequency identification transceivers. Such sensor devices may be used to determine the vehicle's attitude, position, heading, velocity, location, acceleration, operation history, and the like. Sensor systems may also be used to sense objects around the vehicle 200, such as other vehicles, pedestrians, bicyclists, buildings, traffic signs, traffic lights, intersections, bridges, and the like.

Some embodiments can also include crash sensors. Vehicles can include crash sensors that are used for various purposes. For example, an onboard computer may monitor crash sensors to determine when to deploy one or more airbags, or enable other safety systems, as well as the deployment of the protective structure(s). In some embodiments, a computing system could have access to sensed information from crash sensors through an onboard diagnostics system.

In different embodiments, the onboard computing system 210 of vehicle 200 may be configured to communicate with one or more remote systems over a network (not shown in FIG. 2). The network could comprise any wide area network, local area network or other suitable network. In some cases, network may be the Internet. The onboard computing system 210 may communicate, for example, with one or more external database systems. An external database system can include a server (including processors and memory) and a database, and the external database system may store various kinds of information, including, but not limited to: navigation information, geospatial information, road conditions (for example, real-time traffic patterns), weather information (including, for example, rain, snow, ice and/or flooding forecasts), as well as other kinds of information. It may be appreciated that onboard computing system 210 may both send and receive information to and from these remote databases. Moreover, it may also be appreciated that in other embodiments, one or more of these databases (or parts of the databases) could be locally disposed within vehicle 200.

As seen in FIG. 2, the vehicle 200 further includes a driver interface system 240. The driver interface systems 240 may be used to interface with the driver or other occupant of the vehicle. To achieve this interface, the interface systems may include input and output devices including but not limited to keyboards, touchscreens, microphones, scroll wheels, displays, speakers, and haptic systems. Driver interface system 240 may be configured to display or otherwise present options and settings as well as information about external road conditions around the vehicle 200 or other motor vehicles traveling on the roadways. For example, some aspects of the driver interface system 240 can be presented via a vehicle display screen 206. In other embodiments, a mobile device such as a tablet or mobile phone can be configured to present aspects of the driver interface system 240. In one embodiment, the driver interface system 240 can be configured to allow a driver 202 to trigger deployment and retraction of one or both of the side bumper(s). In such cases, the driver interface system 240 can connect to a bumper deployment module ("deployment module") 270 that is configured to transmit control commands to the protective structure mechanism (see FIG. 3).

In different embodiments, the deployment module 270 is or incorporated in an intelligent system that is implemented, managed, or maintained by the onboard computing system 210 with reference to sensor systems and interface systems, as discussed above. The onboard computing system 210 may also include control systems configured to use or otherwise respond to the data gathered by the sensor systems to control features the vehicle, such as side bumper deployment.

Figure 3:
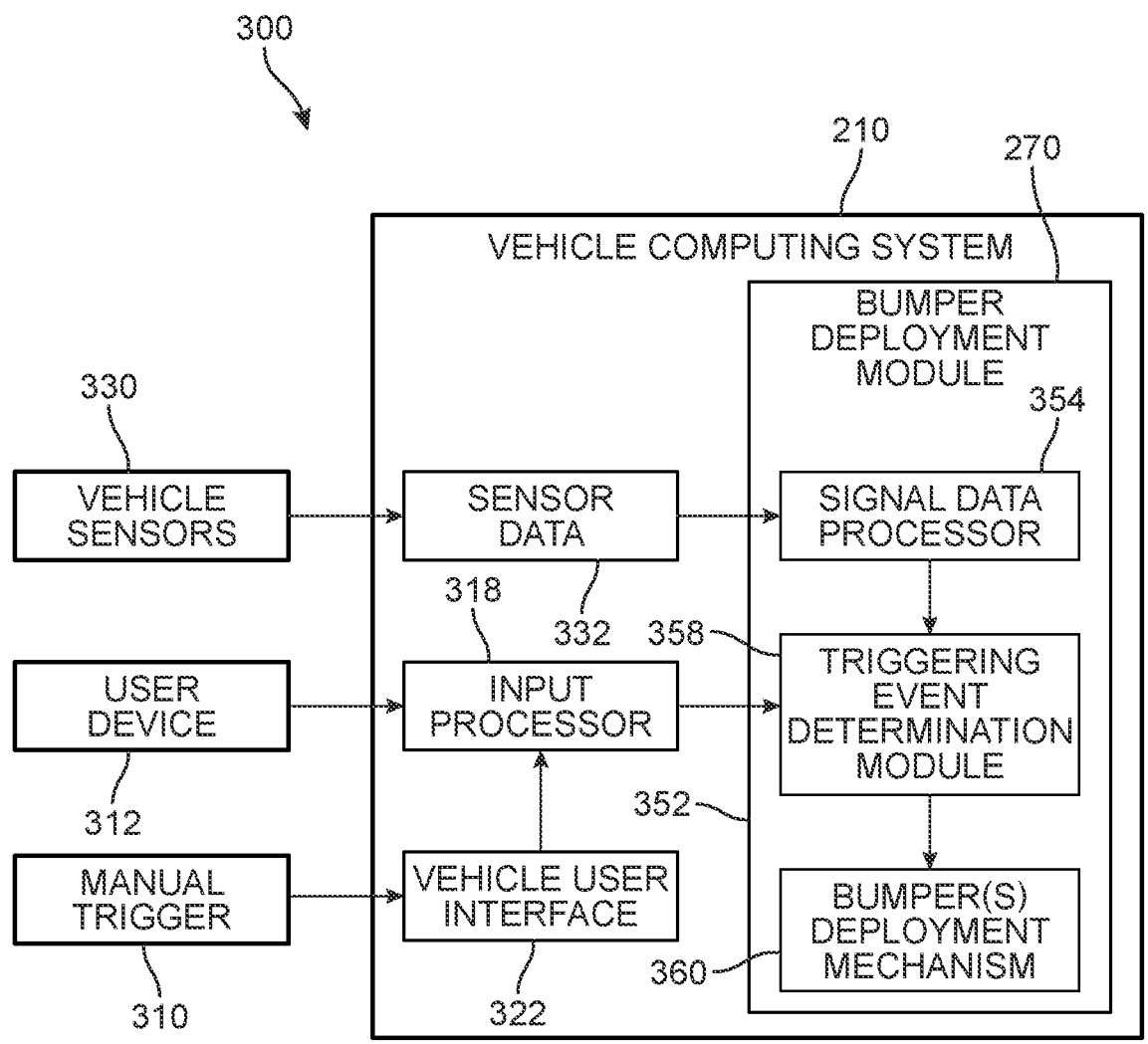
FIG. 3 is a flow diagram of a process of a triggering event causing the deployment of protective structures for a vehicle, according to an embodiment.

In FIG. 3, an embodiment of a schematic process diagram of a protective deployment system 300 is depicted. It can be seen that deployment can be initiated manually and/or automatically. In the case of a manual initiation, a user may select an option for a manual trigger 310 via an interface provided via a user device 312 or through a vehicle user interface 322. Thus, communications may optionally be established between vehicle computing system 302 and user device 312. The manual trigger 310 may be submitted in anticipation of a future accident occurring, and/or it may be desired for other purposes. In some embodiments, the user may also submit a request that causes a disabling or retracting the protective structure. The manual trigger 310 command is received by an input processor 318 of the vehicle computing system 210, which conveys a signal to a triggering event determination module 358 of deployment module 270. The system is configured in such cases to respond by deploying the selected bumper via a bumper deployment mechanism 360.

In the case of an automated initiation, the triggering event will correspond to one or more sensor data 332 received via vehicle sensors 330 indicating a likelihood of an accident. Vehicle sensors 330 can measure a parameter related to the vehicle or the surrounding environment. In one embodiment the vehicle has an onboard diagnostic (OBD) system included in or connected to vehicle computing system 210. The OBD may be a system configured to continuously monitor various aspects of a vehicle such as the powertrain, emissions, chassis, and body of the vehicle, as well as other vehicle aspects. The OBD can be monitoring various automotive sensors built within the vehicle. In the automotive industry there is an industry wide standard for OBD computers, and what the OBD system monitors, known as OBD-II. These standard sensors provide data relating to various vehicle systems including the engine, transmission, chassis, and other vehicle systems. In one embodiment the activation sensor(s) are sensors already incorporated in the OBD. In another embodiment one or more of the sensors are separate from the OBD.

For purposes of this application, an activation sensor refers to a sensor that captures data that can be utilized by the triggering event determination module 358 to cause an activation of the bumper deployment mechanism 360. The activation sensor may be an accelerometer or other types of sensors such as one or more of a velocity sensor, a temperature sensor, a pressure sensor, a decibel meter including a microphone, an angular position sensor, a location sensor (such as GPS), a linear position sensor, a rotational motion sensor, an inertial sensor, or another type of sensor capable of measuring a parameter the may indicate if a vehicle accident may be imminent. In one embodiment, the activation sensor may be a microphone or decibel meter and the activation threshold may be a certain decibel level, a change in decibel level measured over a certain period of time, a frequency spectrum, and/or magnitude predetermined to likely indicate and accident in progress or about to occur. For instance, a vehicle may slam on the brakes causing tires to screech against pavement. The decibel meter may measure this screech noise to see if it exceeds an activation threshold and, in response, the triggering event determination module 358 may send an activation signal to the bumper deployment mechanism 360 to activate the bumper(s). In another embodiment, the activation sensor may be a pressure sensor. The pressure sensor may measure force per unit area or other force metrics. If another vehicle hits the vehicle, the pressure sensor would measure the change in force and result in an activation signal being generated.

In different embodiments, a signal data processor 354 of the deployment module 270 receives and analyzes the sensor data 332 to determine that the likelihood that an accident occurred has exceeded a threshold. For example, the sensor data may relate to an airbag being activated, to car damage being detected, to an acceleration (including a deceleration) that exceeds an acceleration threshold, and/or any other data that might be indicative of an accident. Alternatively, the data may instead be an internally generated signal based on measurements and analysis internal to the vehicle computing system 210. In some embodiments, the vehicle computing system 210 can be configured to set an activation threshold for each of the activation sensor(s). The activation sensor will, either continuously or periodically, measure the parameter. If the activation threshold is not met the activation sensor will continue to monitor the parameter. If the activation threshold is met, vehicle computing system 210 will activate or deploy the bumper(s).

As one non-limiting example, vehicle sensors 330 may include an accelerometer that may be used to measure the acceleration and deceleration of a vehicle. In one embodiment, if a sensor detects a measurement that meets an activation threshold it can send an activation signal to the deployment module 270. In the current embodiment, the threshold may be a certain deceleration. If the vehicle's speed decreases a threshold amount in less than or equal to a specified period of time, the triggering event determination module 358 determines an accident is imminent or has occurred. In response to such a determination, the bumper deployment mechanism 360 will be activated. As an example, the triggering event determination module 358 threshold may be set for −12 meters per second squared (m/s$^2$). In one example scenario, the vehicle 100 may be traveling at 50 kilometers per hour (km/hr) and the vehicle's operator notices a stopped vehicle. The vehicle's operator applies the brakes and starts slowing down at a rate of −12.5 m/s$^2$. The accelerometer would detect that -12.5 m/s$^2$ exceeds the activation threshold of −12 m/s$^2$ and the triggering event determination module 358 would send the signal to activate the bumper deployment mechanism 360. Thus, in some embodiments, the bumper deployment mechanism 360 includes a processor or switch capable of receiving an activation signal from the triggering event determination module 358. After the processor receives an activation signal the processor activates the bumper deployment mechanism 360. One or both side bumpers may then immediately pop-out from the sides of the vehicle, protecting the vehicle from the effects of a side collision.

In another example embodiment, the system may be triggered based on data received from multiple and varied sensors. As an example, vehicle computing system 210 may be in communication with a pressure sensor, an accelerometer, and a decibel meter. In this embodiment each sensor has an activation threshold based on the parameter the sensor is designed to monitor (force/unit area, m/s$^2$, and decibel level respectively). A single sensor measuring its corresponding activation threshold may trigger an activation threshold. In another embodiment, the triggering event determination module 358 may require two or more sensors to meet the activation threshold before triggering the bumper deployment. If the system requires two or more activation signals the system may prevent false signals and prevent unwanted deployments. In another example, a vehicle may include multiple pressure sensors at varying points in the vehicle's body. A vehicle may require multiple pressure sensors, accelerometer, or other types of sensors in order to accurately determine if an accident is occurring. A system with multiple types of sensors would still be effective in the event of failure of one of the sensors.

Those skilled in the art will appreciate that other triggers and sensors may be used in the system. The system is not limited to accelerometers, decibel meters, and/or pressure sensors. The system may be triggered by one of the vehicles safety systems being deployed such as the use of anti-lock brakes or the air bags being deployed. Alternatively, the system could be triggered using a distance sensor such as a laser range finder, an ultrasonic sensor, an infrared sensor, or some other type of distance sensor. Other systems triggers could be used such as a system that monitors driver alertness or that monitors for objects in the vehicles path. In another embodiment, the system contains a light sensor that can detect vehicle brake lights of vehicles traveling in front of the monitoring vehicle. Furthermore, as noted above, the driver could also manually trigger the monitoring system using a button, a voice command, or some other manual trigger. Those skilled in the art will appreciate that a multitude of other sensors and triggers could be used and the embodiments are not limited to the listed sensors.

Figure 4A:
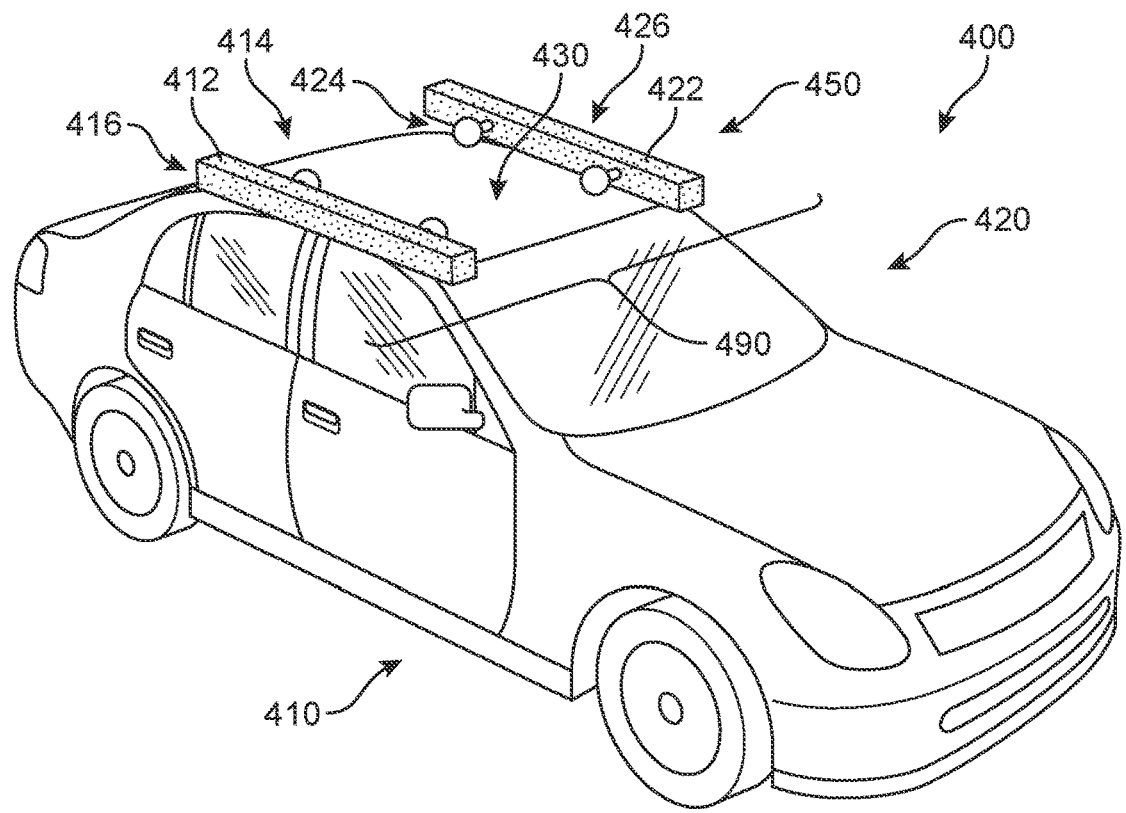
FIGS. 4A and 4B illustrate an embodiment of a bumper deployment system in which the bumpers are stored above the vehicle.

Referring now to FIGS. 4A-7B, three non-limiting examples of protective structure deployment systems are illustrated. In FIGS. 4A and 4B, a first deployment system 490 is installed on a roof 430 of a first vehicle 400. The first deployment system 490 includes a first device 416 disposed along a first peripheral portion of the roof 430 toward a first side 410, and a second device 426 disposed along a second peripheral portion of the roof 430 toward an opposing, second side 420. The first device 416 includes a first bumper structure 412 and a first deployment mechanism 414, and the second device 426 includes a second bumper structure 422 and a second deployment mechanism 424, each deployment mechanism is stored or held within a receptacle. The bumper is generally adjacent to or in contact with the receptacles. In the initial (undeployed) mode shown in FIG. 4A, the bumper structures are stored or disposed directly on or above the outer edges of the roof 430.

Figure 4B:
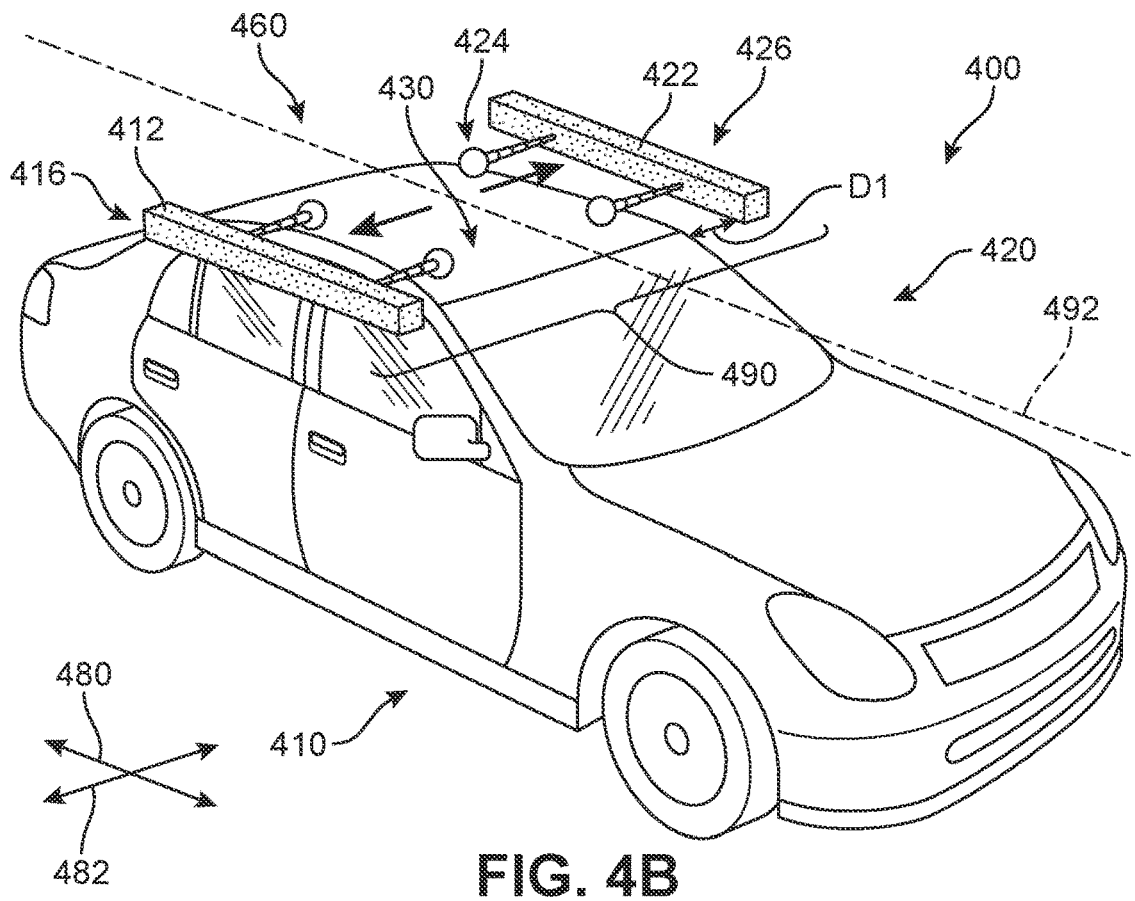

As discussed earlier, sensors associated with the vehicle are configured to transmit data to a deployment module. When a triggering event occurs, the first deployment system 490 shifts from a dormant, inactive, or retracted mode 450 as shown in FIG. 4A to a deployed mode 460, as shown in FIG. 4B. In FIG. 4B, the bumper structures for both the first device 416 and the second device 426 have extended or protruded outward, away from the roof 430, such that there is a first distance D1 between the bumper and the outermost surface of the vehicle's side portion, in a direction that would bring the bumper in closer proximity to any colliding objects such as other vehicles, buildings, trees, etc. This occurred when the deployment mechanism pushed the bumper away from receptacle (i.e., there is a spacing between the two components of the device). The bumpers have moved distally outward (away from a first longitudinal midline 492) in a direction aligned with a lateral axis 482, where lateral axis 482 is perpendicular to a longitudinal axis 480 that is aligned with the direction extending between the front to the rear of the vehicle. In other words, each bumper is now located or extends outside of the vehicle's normal outermost perimeter. Once the bumpers have been deployed, the first vehicle 400 is, to some extent, able to safely absorb impacts to its sides as the bumper structures extend further out to the side than any other portion of the vehicle. Thus, each deployed bumper provides the surfaces that will make first contact if the vehicle is impacted at low speed from either the first side 410 or the second side 420.

Figure 5A:
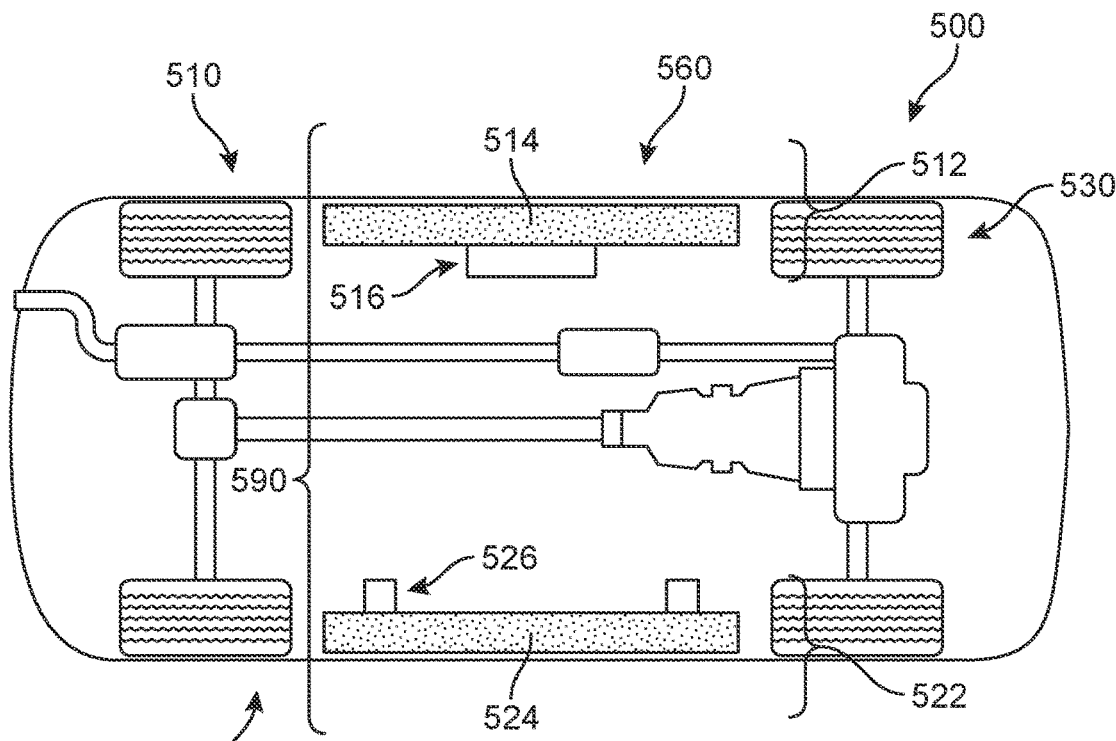
FIGS. 5A and 5B illustrate an embodiment of a bumper deployment system in which the bumpers are stored below the vehicle.
Figure 5B:
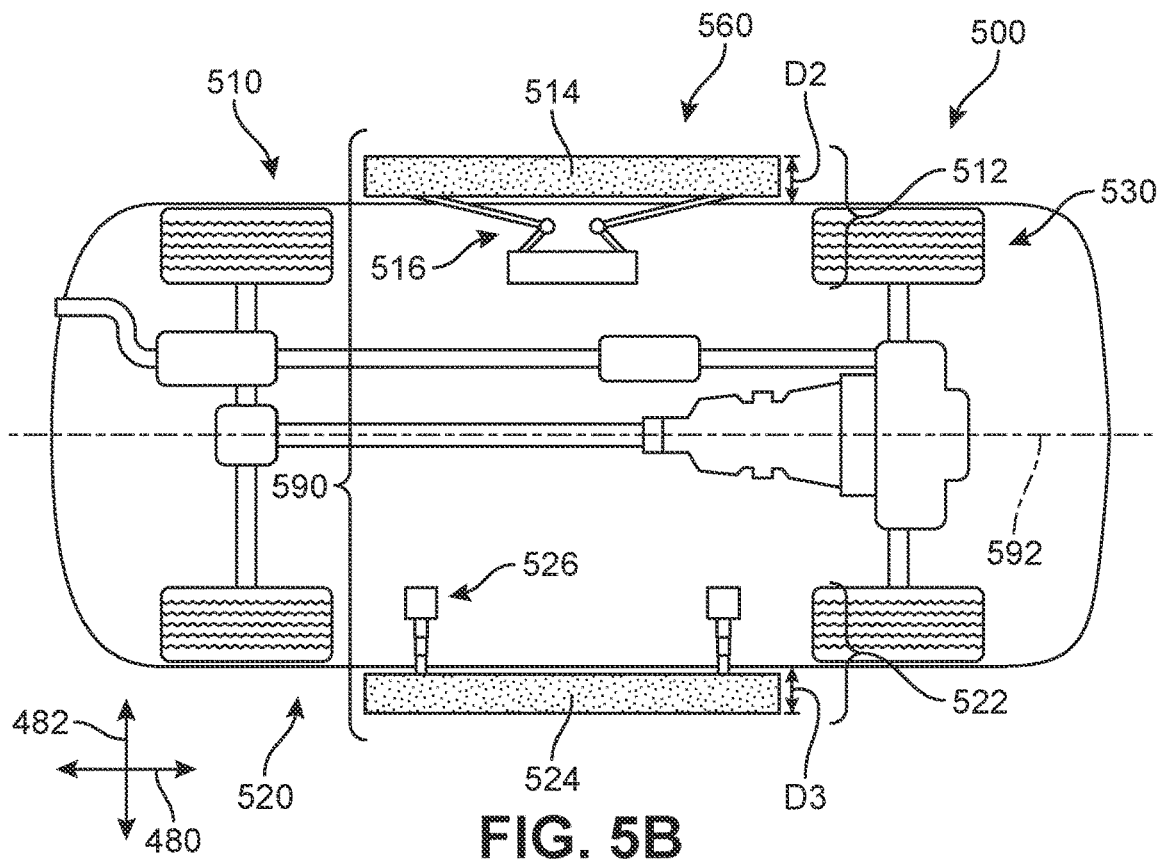

Another example is presented with reference to FIGS. 5A and 5B. A bottom-up view of a second vehicle 500 including a second deployment system 590 is shown. In contrast to FIGS. 4A and 4B where the system was secured to the car roof, in this case the second deployment system 590 is disposed along an underside 530 of the second vehicle 500. In some embodiments, some or all portions of the second deployment system 590 may be secured to a chassis of the vehicle. The second deployment system 590 includes a first device 512 disposed along a first peripheral portion of the underside 530 toward a first side 510, and a second device 522 disposed along a second peripheral portion of the underside 530 toward an opposing, second side 520. The first device 512 includes a first bumper structure 514 fixedly attached to a first deployment mechanism 516 held in a first housing (represented as a rectangular box), and the second device 426 includes a second bumper structure 524 fixedly attached to a second deployment mechanism 526 held in a second housing and third housing. In the initial (undeployed) mode shown in FIG. 5A, the bumper structures are stored or disposed directly beneath or below the outer perimeter or edge of the underside 530 and are directly adjacent to or in contact with their respective mechanism housings.

As discussed earlier, sensors associated with the vehicle are configured to transmit data to a deployment module. When a triggering event occurs, the second deployment system 590 shifts from a dormant, inactive, or retracted mode 550 as shown in FIG. 5A to a deployed mode 560, as shown in FIG. 5B. In FIG. 5B, the bumper structures for both the first device 512 and the second device 522 have extended or protruded outward relative to a second longitudinal midline 592 of the vehicle, and further from the underside 530. The first bumper structure 514 is now spaced apart by a second distance D2 from the vehicle's first side 510 and the second bumper structure 524 is now spaced apart by a third distance D3 from the vehicle's second side 520. This spacing has increased in a direction that bring the bumpers in closer proximity to any colliding objects such as other vehicles, buildings, trees, etc. In other words, the bumpers have moved distally in a direction aligned with the lateral axis 482 that extends between the first side 510 and the second side 520.

Thus, each bumper is now located or extends outside of the vehicle's normal outermost perimeter. Once the bumpers have been deployed, the first vehicle 500 is, to some extent, able to safely absorb impacts to its sides as the bumper structures extend further out to the side than any other portion of the vehicle. Each deployed bumper provides the surfaces that will make first contact if the vehicle is impacted from either the first side 510 or the second side 520. It can be appreciated that the mechanism by which the bumpers are extended or 'popped' outward can vary; two different mechanisms are shown in FIG. 5B simply for purposes of illustration.

Figure 6A:
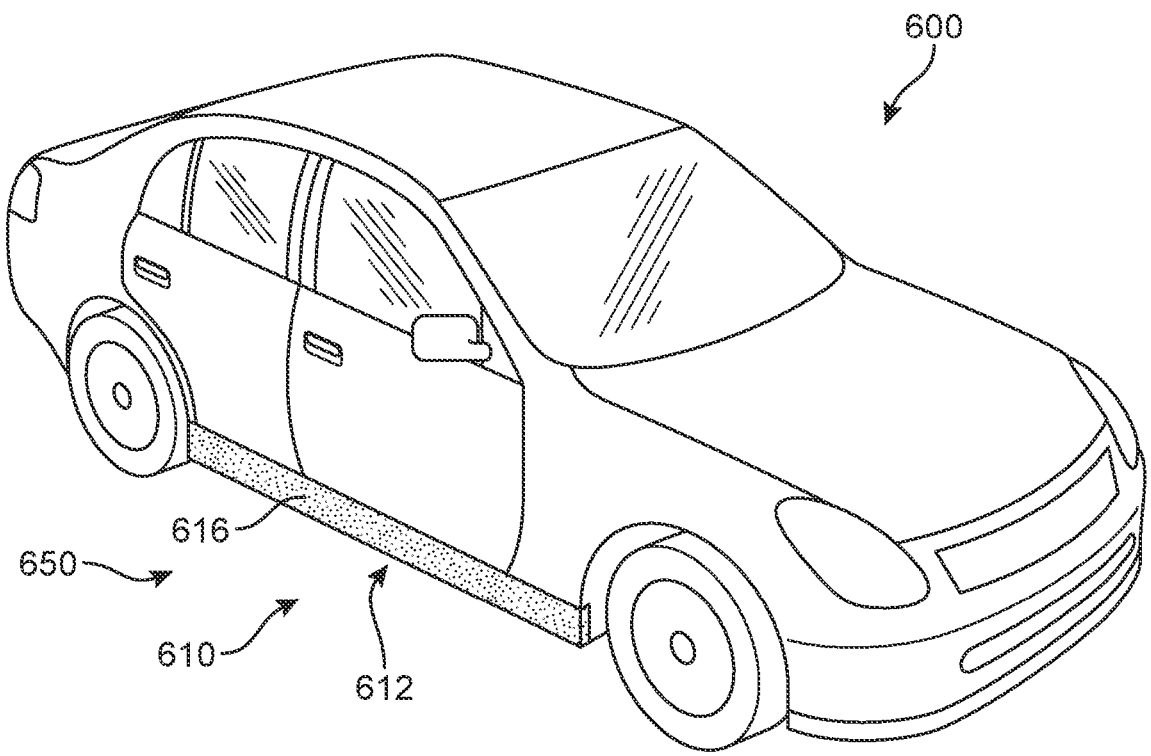
FIGS. 6A and 6B illustrate an embodiment of a bumper deployment system in which the bumpers are stored along the sides of the vehicle.
Figure 6B:
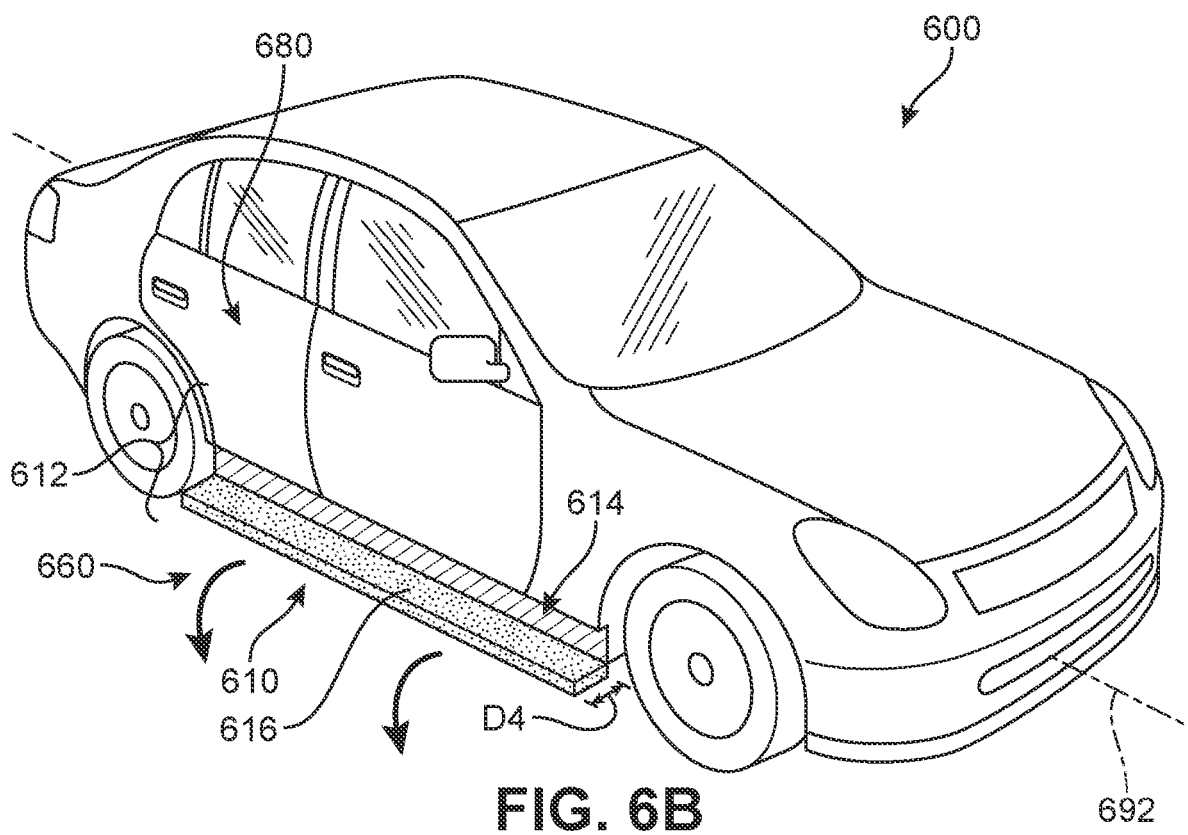
Figure 7B:
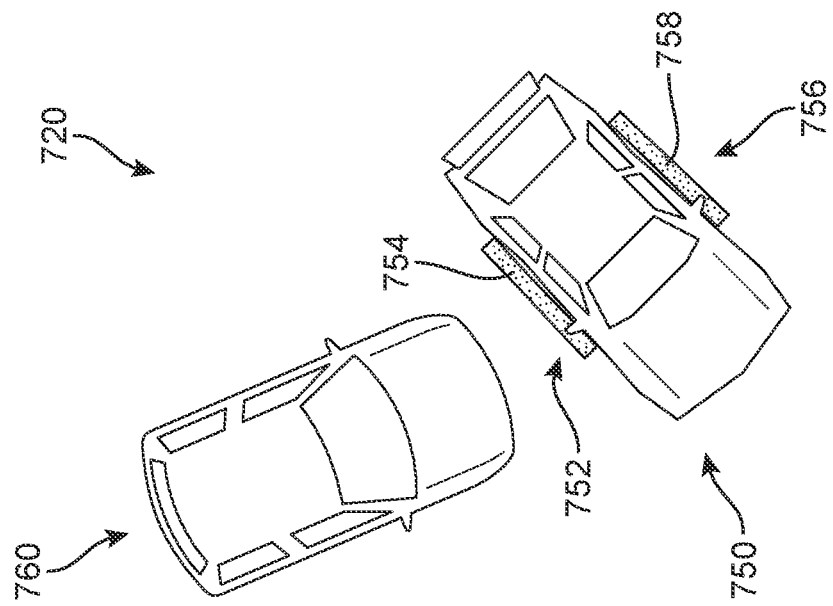
FIGS. 7A-7D are a depiction of a scenario in which an embodiment of a bumper deployment system is activated in response to a triggering event.
Figure 7A:
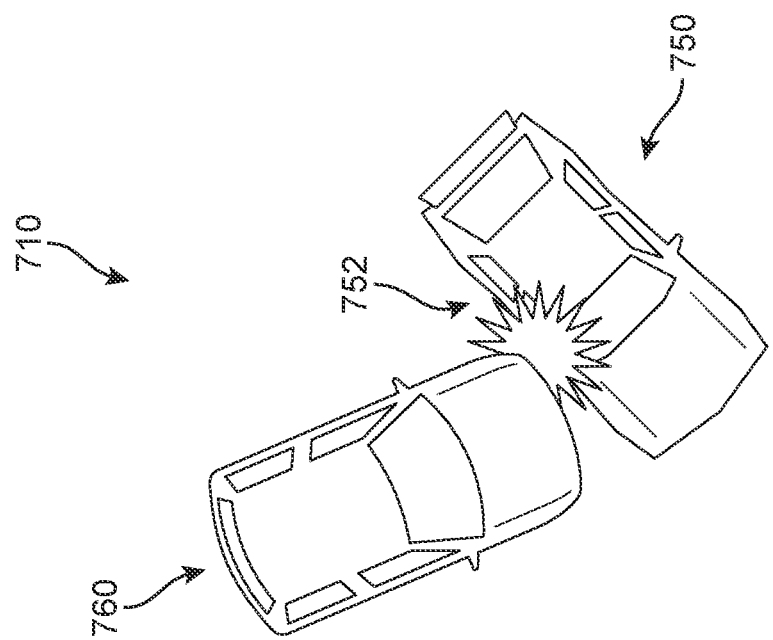
Figure 7D:
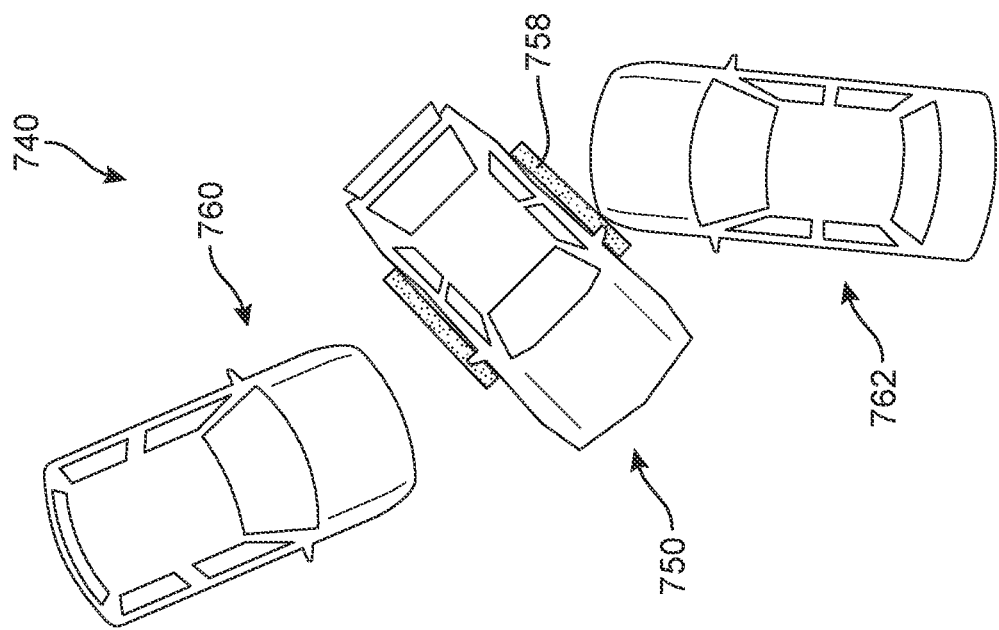
Figure 7C:
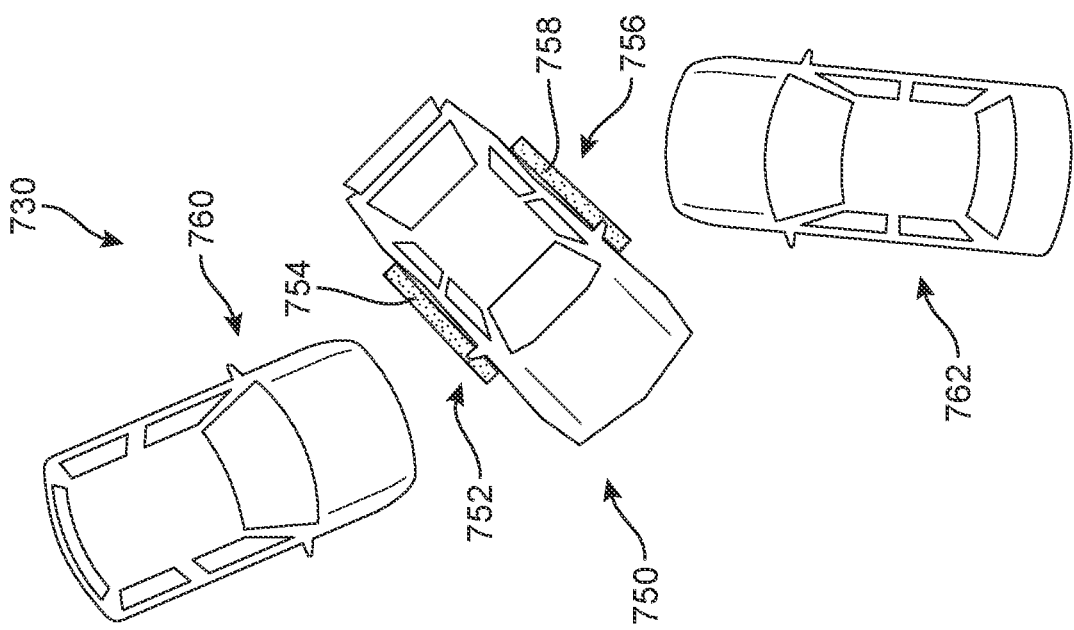
Figure 8:
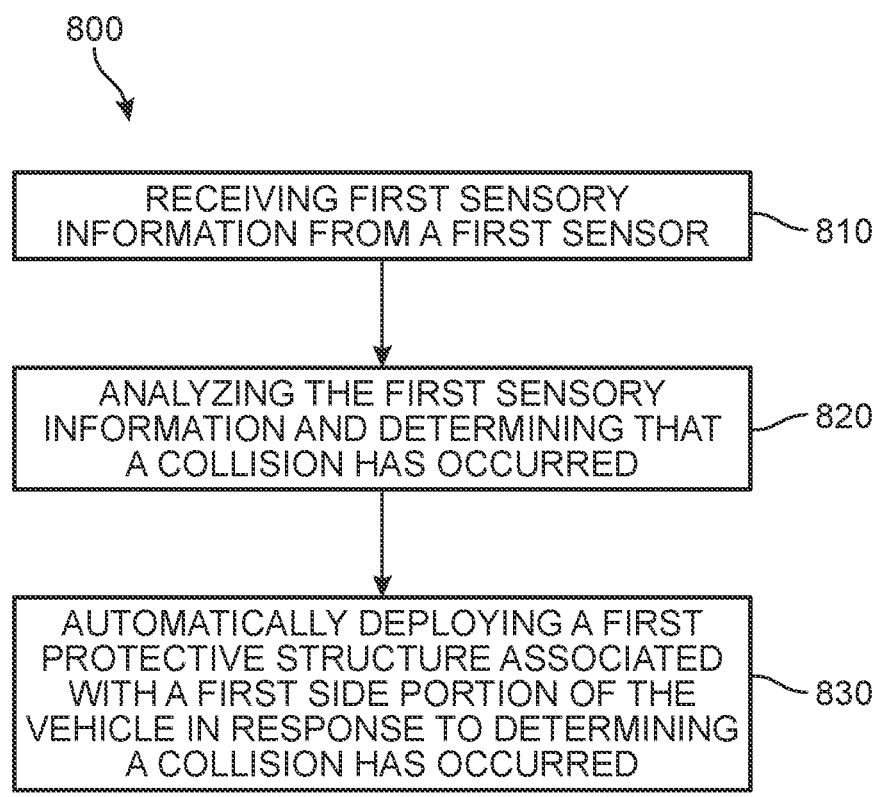
FIG. 8 is a flow chart depicting a process of deploying a protective structure on a vehicle in response to a determination that a triggering event has occurred, according to an embodiment.

A third example similar to the configuration of FIGS. 1A and 1B is presented now with reference to FIGS. 6A and 6B, where a third vehicle 600 including a third deployment system is shown. In this case only one side of the third deployment system can be seen due to the pose of the vehicle. In some embodiments, some or all portions of the third deployment system may be secured to a portion of the exterior surface of a side of the vehicle. The third deployment system here includes at least a first device 612 disposed along a first peripheral portion of the exterior comprising a first side 610 of the third vehicle 600. Although not shown, in different embodiments, the opposing side may also include a similar, second device. The first device 612 includes a first bumper structure 616 secured to a portion of the vehicle exterior directly beneath or below passenger doors 680. In the initial (undeployed) mode shown in FIG. 6A, the bumper structure is stored or disposed within a compartment or recess formed directly beneath or below the outer perimeter or lower edge of the passenger doors 680, such that the outer panel of the first bumper structure 616 is approximately flush with the exterior surface. In other embodiments, the first bumper structure 616 may not be stored within a recess but instead be placed or disposed against the exterior surface itself and so have a thickness that extends slightly outward relative to the vehicle exterior.

As discussed earlier, sensors associated with the vehicle are configured to transmit data to a deployment module. When a triggering event occurs, the third deployment system shifts from a dormant, inactive, or retracted mode 650 as shown in FIG. 6A to a deployed mode 660, as shown in FIG. 6B. In FIG. 6B, the bumper structure has flipped open and outward, having an edge that is further from the vehicle relative to a third longitudinal midline 692, away from the side exterior surface. The first bumper structure 616 now extends away from the vehicle's side by a fourth distance D4 in a direction that would bring the bumper in closer proximity to any colliding objects such as other vehicles, buildings, trees, etc. The outermost surface of the bumper shown in FIG. 6A that was facing toward the side is now facing downward. Once the bumper has been deployed, the third vehicle 600 is, to some extent, able to safely absorb impacts to at least the first side 610 as the bumper structure extends further outward from each side than any other portion of the vehicle. Thus, each deployed bumper provides the surfaces that will make first contact if the vehicle is impacted from the first side 610.

An example of a scenario in which one embodiment of the proposed systems could be implemented is depicted with reference to FIGS. 7-10B. In FIG. 7, an example of a second car 702 in which no vehicle protection system is installed is depicted simply for purposes of reference. The second car 702 is being driven in an underground parking garage 700, which includes multiple concrete pillars arranged in a staggered formation near the parking spaces, as well as tight, narrow driving surfaces requiring tight turns in order to move safely into and out of a parking space. The second car 702 moves from around a first position 710 to around a second position 720 along a path 730 by turning a corner, moving up the garage traffic lane, and turning sharply into a parking space that is directly adjacent to a pillar 740. Unfortunately, as shown in a magnified view 750, as the second car 702 pulls into the parking space, the driver positions the car too close to the pillar 740. A first side 760 of the second car 702 scrapes against the surface of the pillar 740, causing a damage in the form of a substantial scratch 762 on the outer body of the car.

In FIGS. 8A-8D, a similar scenario at a different time is depicted. However, in this example, the vehicle includes a vehicle protection system. Referring first to FIG. 8A, a third car 802 is also being driven through the garage 700 from the first position 710 to the second position 720. As shown in a magnified view 810, in response to sensor data indicating the vehicle initiating a sharp turn, as well as a growing proximity of the car to a potential obstacle (e.g., pillar 740), which are used by the system to determine that the likelihood of collision is above a pre-selected threshold, a triggering event 840 is registered as having occurred. In other embodiments, different conditions can be used to determine a triggering event has occurred, as described above, including sudden braking, zig-zag motion, reversing, swerving, or other vehicle activity indicating a higher likelihood of an accident. Furthermore, external environmental conditions can also be detected and used to determine a triggering event has occurred, such as heavy rain, snow, hail, fog, road construction, proximity of other vehicles or objects, uneven or unpaved roadways, potholes, or other challenging driving conditions.

In response to this determination, the vehicle protection system causes a first side bumper 862 to be deployed from a compartment installed alongside a first side 870 of the third car 802. In other words, the sensors of third car 802 detect the change in status and/or conditions that correspond to a high likelihood of an accident and the system analyzes the sensor data via the bumper deployment module. In response to the determination that a triggering event has occurred, the first side bumper 862 is automatically deployed and protrudes outward from the first side 870.

Thus, when the third car 802 accidentally makes contact with the pillar 740 the first side bumper 862 is deployed and serves as a buffer or guard between the body of the third car 802 and the pillar 740. As illustrated in the three views of FIGS. 8B, 8C, and 8D, the first side 870 of third car 802 remains clear as the first side bumper 862 strikes a portion of pillar 740 when the third car 802 pulls into the parking space. Although a driver 806 of third car 802 attempts to slow down and avoid colliding with the pillar 740, a low-speed collision nevertheless occurs. However, the pillar 740 impacts the first side bumper 862, rather than the more vulnerable exterior surface of the vehicle. The first side bumper 862 absorbs the impact, protecting the body of the third car 802. Furthermore, the noise generated by the impact as the first side bumper 862 scrapes the pillar and/or portions of the bumper crumple or bend, can alert the driver 806 of the danger. In other words, the vibration from the contact between the bumper and the object, as well as the corresponding noise, can serve as a powerful warning or alert to the driver. This information can be used by the driver to decide whether to stop the car and/or reverse or otherwise change their driving behavior in order to prevent further damage or reduce the chance of a more substantial accident occurring.

FIG. 8D is a frontal view of the third car 802 as it enters the parking space, where both the first side bumper 862 and a second side bumper 864 extending from an opposite, second side 872, which was also automatically deployed when the first side bumper 862 was deployed. The first side bumper 862 extends outward a first distance 880 from the exterior of the first side 870 of the car and the second side bumper 864 extends outward a second distance 882 from the exterior of the second side 872 of the car. In some embodiments, the first distance 880 and second distance 882 are substantially similar, and of a sufficient distance to maintain a space between any nearby obstacle and the body of the vehicle to prevent any damage to the body of the vehicle.

In different embodiments, the deployment systems described herein may include provisions for determining when the protective structures are no longer needed or desired. In some embodiments, the bumpers may be deployed for a pre-set time period. In another embodiment, the bumpers would be retracted when the onboard computing system, based on data received from one or more sensors, determines that the vehicle has returned to normal or standard operating conditions ("normal operating status"). Other options for retracting the side bumpers may include the vehicle's operator manually submitting a request for termination of the bumper deployment. Alternatively, if the system determines the vehicle is no longer in operation, it may automatically withdraw the bumpers. Referring to FIGS. 9A and 9B, an example of the deactivation or retraction of the bumpers is presented. In FIG. 9A, the vehicle protection system determines that one or more condition have been met for retraction of the bumpers and initiates the mechanism for pulling each bumper back into its respective compartment. In FIG. 9B, the bumpers have been disengaged and are no longer visible. Thus, when the driver 806 exits the third car 802, he or she finds no sign of damage to the car. Meanwhile, the side bumpers have been stowed away out of view. In this case, one of the side bumpers may have been dented or otherwise damaged, but this will not be observable once the bumper has been retracted.

In different embodiments, the side bumper system includes provisions for easy replacement or repair access to the side bumper(s). For example, in some embodiments, the damaged bumper can be a modular component that may be readily removed or detached from the side of the vehicle and replaced with a new bumper, or the repaired bumper. This enables any damage to be absorbed by a temporary or disposable component, while the vehicle itself remains undamaged, thereby substantially reducing both costs and time that might otherwise be expended on vehicle care, as well as preserving the outer appearance of the vehicle for a longer period.

FIG. 10 is a flow chart illustrating an embodiment of a method 1000 of deploying a protective structure on a vehicle based on detecting conditions indicating a high likelihood of an imminent vehicle collision and/or that a collision has occurred. The method 1000 includes a first step 1010 of receiving first sensory information from a first sensor, and a second step 1020 of analyzing the first sensory information and determining that a triggering event (such as a collision) has occurred, or if a collision is likely to occur. The method 1000 further includes a third step 1030 of automatically deploying a first protective structure associated with a first side portion of the vehicle, in response to determining that a triggering event has occurred.

In other embodiments, the method may include additional steps or aspects. In one embodiment, the first sensor is disposed in the vehicle, and in another embodiment, the first sensor is connected to an onboard computing system for the vehicle. As another example, in some embodiments, the first sensor is one of a velocity sensor, a temperature sensor, a pressure sensor, a decibel meter including a microphone, an angular position sensor, a location sensor, a linear position sensor, a rotational motion sensor, and an inertial sensor.

In some embodiments, the method further includes one or more steps such as deploying a second protective structure associated with a second side portion of the vehicle, where the second side portion and the first side portion correspond to opposing sides of the vehicle. The method may also include steps of receiving second sensory information from a second sensor, analyzing the second sensory information and determining that the vehicle has returned to a normal operating status, and automatically retracting the first protective structure. Furthermore, in different embodiments, the first protective structure, when deployed, extends a further distance outward relative to a longitudinal midline of the vehicle, and a shorter distance relative to the longitudinal midline of the vehicle when retracted.

Other methods can also be contemplated within the scope of this disclosure. For example, a method of triggering deployment of a protective structure on a vehicle can include a first step of receiving, at an onboard computing system for the vehicle, first data, a second step of determining that the first data matches a condition corresponding to a triggering event, and a third step of deploying, in response to determining a triggering event has occurred, a first protective structure from a first side of the vehicle.

In other embodiments, the method may include additional steps or aspects. In one embodiment, the first data corresponds to sensory information obtained by a sensor disposed in the vehicle, and in another example the first data includes information indicating a collision has occurred. In one embodiment, the first data corresponds to a first user input requesting the deployment of the first protective structure. In different embodiments, the method also includes steps of receiving, at the onboard computing system, a second user input requesting a retraction of the first protective structure, and then retracting, in response to receiving the second user input, the first protective structure. In another embodiment, the method also includes a step of deploying a second protective structure from a second side of the vehicle.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of triggering deployment of a protective structure on a vehicle, the method comprising:
   receiving, at an onboard computing system for a first vehicle, first data including data values associated with vehicle dynamics information about one or more other vehicles, and second data including data values associated with one or more of the following:
      information about the first vehicle, including: vehicle attitude, vehicle position, vehicle heading, vehicle velocity, vehicle acceleration, vehicle location, or vehicle operating history; and
      information about one or more additional parameters, including: driver alertness, information about pedestrians, information about bicyclists, information about buildings, information about traffic signs, information about traffic lights, information about intersections, information about bridges, sounds, vibrations, images, navigation information, geospatial information, information about road conditions, or manual protective structure initiation information;
   determining, by the onboarding computing system executing one or more machine learning algorithms trained to detect features associated with collisions, that, based on the first data and the second data, a condition corresponding to a triggering event has occurred whereby the data value of the first data meets a first activation threshold and the data value of the second data meets a second activation threshold, in order to prevent false deployment of one or more protective structures; and
   deploying, in response to determining the triggering event has occurred, a first protective structure from a first side of the vehicle.

2. The method of claim 1, wherein the first data corresponds to sensory information obtained by a sensor disposed in the vehicle.

3. The method of claim 2, wherein the first data includes information indicating a collision has occurred.

4. The method of claim 1, wherein the first data corresponds to a first user input requesting the deployment of the first protective structure.

5. The method of claim 4, further comprising:
   receiving, at the onboard computing system, a second user input requesting a retraction of the first protective structure; and
   retracting, in response to receiving the second user input, the first protective structure.

6. The method of claim 1, further comprising deploying, in response to determining the triggering event has occurred, a second protective structure from a second side of the vehicle.

7. A method of deploying a protective structure on a first vehicle based on detecting conditions indicating a likelihood of an imminent vehicle collision, the method comprising:
   receiving first sensory information regarding vehicle dynamics of one or more other vehicles, and receiving second sensory information regarding the first vehicle from one or more devices selected from a group consisting of a user interface, a microphone, a camera, a motion sensor, a velocity sensor, a temperature sensor, a pressure sensor, a decibel meter, an angular position sensor, a location sensor, a linear position sensor, a rotational motion sensor, an inertial sensor, a status sensor, a gyroscope, an accelerometer, a wheel speed sensor, a global positioning system (GPS), an onboard diagnostic (OBD) system, an anti-lock brake system, and an air bag system;

analyzing, using one or more machine learning algorithms trained to detect features associated with collisions, the first sensory information and the second sensory information and automatically determining whether a collision is likely to occur; and based on the analysis of the first sensory information and the second sensory information, automatically deploying a first protective structure associated with a first side portion of the vehicle if the first sensory information and the second sensory information each meet an individual activation threshold.

8. The method of claim 7, wherein at least one of the one or more devices is disposed in the first vehicle.

9. The method of claim 7, wherein at least one of the one or more devices is connected to an onboard computing system for the vehicle.

10. The method of claim 7, further comprising:

deploying a second protective structure associated with a second side portion of the vehicle, the second side portion and the first side portion corresponding to opposing sides of the vehicle, if the information received from two or more of the one or more devices meets individual activation thresholds.

11. The method of claim 7, further comprising:

receiving additional sensory information from one or more sensors;

analyzing the additional sensory information and determining that the vehicle has returned to a normal operating status; and automatically retracting the first protective structure.

12. The method of claim 11, wherein the first protective structure, when deployed, extends a further distance outward relative to a longitudinal midline of the vehicle, and a shorter distance relative to the longitudinal midline of the vehicle when retracted.

13. A system for deployment of a protective structure for a first vehicle in response to conditions indicating an imminent vehicle collision is likely, the system comprising a processor and machine-readable media including instructions which, when executed by the processor, cause the processor to:

receive first sensory information regarding vehicle dynamics of one or more other vehicles, and receiving second sensory information regarding the first vehicle from one or more devices selected from a group consisting essentially of a user interface, a microphone, a camera, a motion sensor, a velocity sensor, a temperature sensor, a pressure sensor, a decibel meter, an angular position sensor, a location sensor, a linear position sensor, a rotational motion sensor, an inertial sensor, a status sensor, a gyroscope, an accelerometer, a wheel speed sensor, a global positioning system (GPS), an onboard diagnostic (OBD) system, an anti-lock brake system, and an air bag system;

analyze, using one or more machine learning algorithms trained to detect features associated with collisions, the first sensory information and the second sensory information and automatically determine whether a collision is likely to occur; and based on the analysis of the first sensory information and the second sensory information, automatically deploy a first protective structure associated with a first side portion of the vehicle if the first sensory information and the second sensory information each meet an individual activation threshold.

14. The system of claim 13, wherein at least one of the one or more devices is disposed in the vehicle.

15. The system of claim 13, wherein at least one of the one or more devices is connected to an onboard computing system for the vehicle.

16. The system of claim 13, wherein the instructions further cause the processor to deploy a second protective structure associated with a second side portion of the vehicle if the information received from two or more of the one or more devices meets individual activation thresholds, the second side portion and the first side portion corresponding to opposing sides of the vehicle.

17. The system of claim 13, wherein the instructions further cause the processor to:

receive additional sensory information from one or more sensors; and analyze the additional sensory information and determine that the vehicle has returned to a normal operating status.

18. The system of claim 17, wherein the first protective structure, when deployed, extends a further distance outward relative to a longitudinal midline of the vehicle, and a shorter distance relative to the longitudinal midline of the vehicle when retracted.

19. The system of claim 17, wherein the instructions further cause the processor to automatically retract the first protective structure if the vehicle has returned to a normal operating status.

20. The system of claim 13, wherein the second sensory information includes automatic initiation information or manual initiation information.

* * * * *